United States Patent [19]

Patterson et al.

[11] Patent Number: 4,951,299

[45] Date of Patent: Aug. 21, 1990

[54] INTERMEDIATE MIXING GRID

[75] Inventors: John F. Patterson, Richland; Richard H. Ewing, West Richland; Jack Yates, Richland, all of Wash.

[73] Assignee: Advanced Nuclear Fuels Corporation, Richland, Wash.

[21] Appl. No.: 295,966

[22] Filed: Jan. 11, 1989

[51] Int. Cl.⁵ ............................................. G21C 3/34
[52] U.S. Cl. .................................... 376/439; 376/443
[58] Field of Search ................................ 376/439, 443

[56] References Cited

U.S. PATENT DOCUMENTS

| | | | |
|---|---|---|---|
| 3,068,163 | 12/1962 | Currier, Jr. et al. | 204/193.2 |
| 3,395,077 | 7/1968 | Tong | 376/439 |
| 3,966,550 | 6/1976 | Foulds | 376/439 |
| 4,039,379 | 8/1977 | Patterson | 376/439 |
| 4,089,741 | 5/1978 | Patterson | 376/439 |
| 4,726,926 | 2/1988 | Patterson | 376/439 |
| 4,849,161 | 7/1989 | Brown | 376/439 |

FOREIGN PATENT DOCUMENTS 0261544 3/1988 European Pat. Off. .
1514559 6/1969 Fed. Rep. of Germany .

Primary Examiner—Donald P. Walsh
Attorney, Agent, or Firm—Lawrence C. Edelman

[57] ABSTRACT

An intermediate mixing grid for nuclear reactor fuel assemblies is made without the usual perimeter strip. The ends of the grid members are formed so that they hold the fuel rods at the edges of the assembly in place.

7 Claims, 5 Drawing Sheets

INTERMEDIATE MIXING GRID

In nuclear reactors intended for the production of power, the nuclear fuel is ordinarily in the form of "fuel rods" which are grouped together in "fuel assemblies." These assemblies are made up of a large number, usually 81 to 289, of slender rods, frequently about 0.4 inch in diameter and 10 feet long. They are bound together at intervals by "grid spacers" each of which normally includes a perimeter strip going around the entire assemblage of rods and an "egg crate" type array of grid strips extending across the assemblage between the rows of fuel rods and connected at their ends to the perimeter strip. Frequently, these grid spacers are provided with means for deflecting the cooling water which flows upwardly between the fuel rods longitudinally thereof, so as to cause a cross flow or swirling movement. This enhances the heat transfer and increases the permissible power output of the assembly. This is illustrated, for example, in U.S. Pat. No. 3,395,077 granted July 30, 1968 to Long Sun Tong et al. and U.S. Pat. No. 4,726,926 granted Feb. 23, 1988 to John F. Patterson et al, the latter patent being assigned to the assignee of this application.

Each of the above patents also shows the provision of "mixing" or "deflecting" grids positioned between the grid spacers and intended to enhance the motion of the cooling water. Such mixing grids are illustrated at reference numeral 18 in FIG. 1 of the Tong, et al. patent and in FIG. 1 of the Patterson, et al. patent. The disclosures of both of these patents are expressly incorporated herein by reference.

SUMMARY OF THE INVENTION

The object of this invention is to improve the structure of the intermediate mixing grids.

While these intermediate mixing grids provide restraint for the fuel rods, that function is served primarily by the grid spacers, and the mixing grids, therefore, do not need to restrain the rods as firmly as do the grid spacers. In the prior art structures, the mixing grids, like the grid spacers, include perimeter strips and an egg-crate type array of connecting strips. We have found that an improved structure can be made by eliminating the perimeter strips and so constructing the ends of the grid strips to provide what restraint is necessary for the fuel rods at the perimeter of the bundle.

This arrangement has several advantages. First, it reduces the flow resistance of the mixing grid, providing a lesser pressure drop in the assembly. This has a subsidiary advantage in the instances in which the fuel assemblies with intermediate mixing grids are mingled with other assemblies which lack those elements. The assemblies with the intermediate mixing grids have greater flow resistance than the assemblies without them. Therefore, there is some tendency for cooling water to bypass the high resistance assemblies and flow instead to the lower resistant adjacent assemblies. By reducing the flow resistance of the intermediate mixing grids, we reduce this tendency toward bypass flow.

Secondly, the elimination of the perimeter strips reduces the likelihood of "hangup" by these grids during refueling operations, since the entire grid lies within the envelope of the planes tangent to the outer surfaces of the outer fuel rods. The mixing grids are relatively fragile as compared to the grid spacers and therefore hangup by them is more likely to be damaging.

In addition, the reduction in parts lowers the cost of manufacture of the intermediate mixing grids and the reduction in the amount of metal therein reduces the parasitic absorption of neutrons during reactor operation.

DETAILED DESCRIPTION

Figure 1:
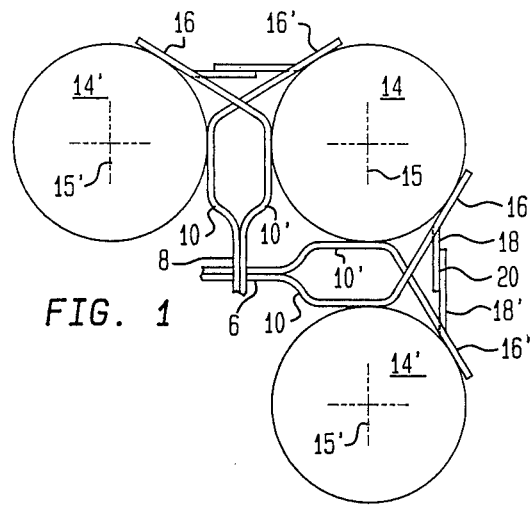
FIG. 1 is a partial plan view of one embodiment of the mixing grid of our invention.
Figure 1A:
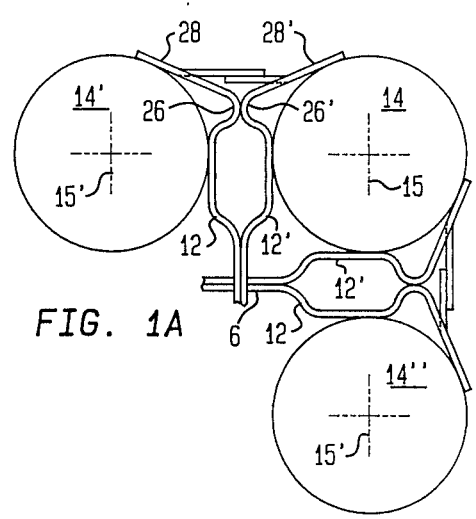
FIG. 1A is a partial plan view of a modification closely related to that of FIG. 1.
Figure 2:
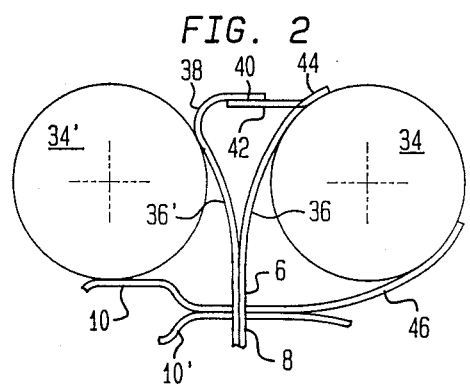
FIG. 2 is a partial plan view of a second embodiment of our invention.
Figure 3:
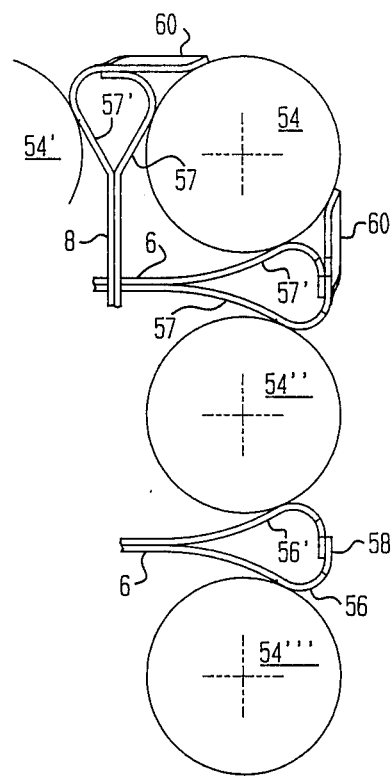
FIG. 3 is a partial plan view of another embodiment of our invention, showing the arrangement at a corner of the assembly.

FIGS. 1, 2 and 3 are modifications applicable to the design of a deflecting grid shown in FIGS. 1, 1a and 1b of U.S. Pat. No. 4,726,926. The disclosure of that patent is expressly incorporated herein by reference. Referring to FIG. 1, the double strips 6 and 8 correspond to the strips of the same numbers in FIG. 1 of the above patent. That is, they form portions of an "egg-crate" structure forming cells through which the fuel rods and guide tubes extend. Like the strips shown in the patent, these strips are formed with channel numbers 10, 10', which cooperate to form dimples which contact the fuel rods 14, 14'. The fuel rod 14 is a corner rod of the assembly whereas 14' represents side rods. As is shown in this figure the walls of channels 10, 10' are extended and cross each other forming extensions 16, 16' which bear on rods 14, 14' respectively, outside a line 15, 15' connecting the centers of those rods. Where members 16, 16' cross, they are slotted and interfitted in the manner shown in FIGS. 1a and 1b of the above patent. They may then be welded at this point. At points spaced from their ends, members 16, 16' are welded to connecting members 18, 18' which are in turn welded together at their crossing 20. This provides a comparatively rigid engagement with the fuel rods to hold them in place. It is not completely rigid however, since there is a short cantilever section on each of members 16, 16' outwardly of their junction with members 18, 18'. This provides the necessary slight degree of flexibility and spring action.

FIG. 1A shows a structure which is very similar to that of FIG. 1 and the reference characters are largely the same for corresponding parts. However, the channel members 12, 12' are bent backwards at 26, 26' to form the extensions 28, 28'. These extensions are joined in the same manner and function in the same manner as extensions 16, 16' of FIG. 1.

FIG. 2 shows another embodiment of our invention. In this figure, as before, two intersecting double strips are shown at 6 and 8. Two of the channel members 10, 10' formed in strip 6 are partially shown as well. The two members of double strip 8 are separated to form strips 36, 36' which contact and hold rods 34, 34'. Members 36, 36' are curved in such a manner that they contact the surfaces of rods 34, 34' respectively, outwardly of a line connecting the centers of those rods. Member 36' is laterally curved at 38 and is welded at 40 to connecting member 42 which in turn is welded to member 36. The latter member has a short portion 44 extending beyond connecting member 42. Rod 34 is a corner rod. One of the members of double strip 6 is shown extended to form an extension 46, which corresponds exactly to member 36 formed on strip 8.

It will be understood that in the structures of all of the figures, the gripping members are repeated across the sides of the deflecting grid.

Figure 3C:
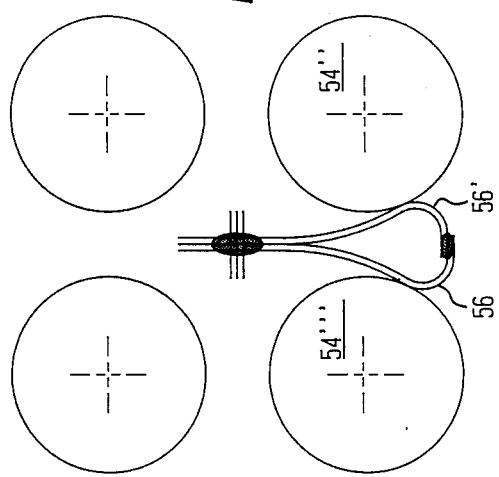
FIGS. 3A through 3H are detail views showing various aspects of the embodiment of FIG. 3.
Figure 3D:
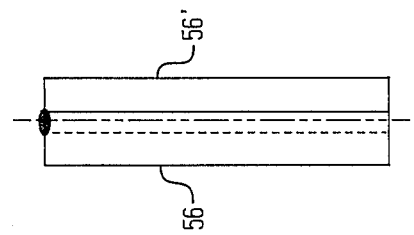
Figure 3A:
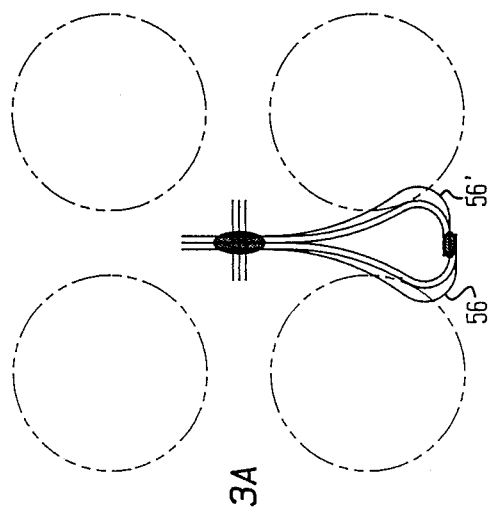
Figure 3B:
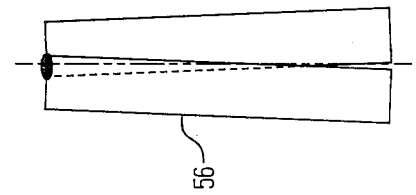
Figure 3E:
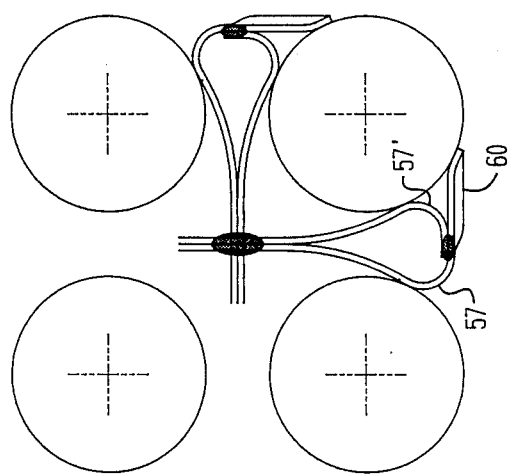
Figure 3G:
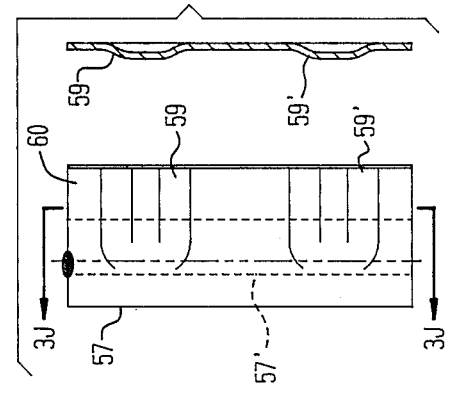
Figure 3F:
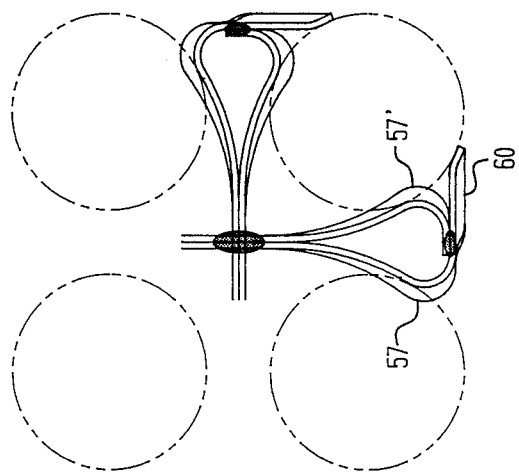
Figure 3H:
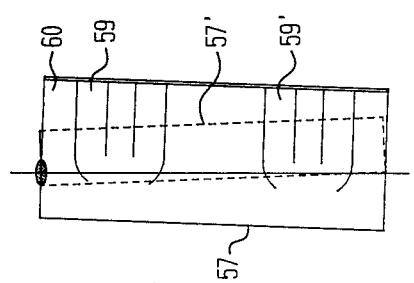

FIGS. 3 and 3A through 3H show the form of grid which we prefer at present. In FIG. 3, 54 is a corner fuel rod. 54', 54", and 54''' are side rods. As in FIGS. 1 and 2, the grid is made up of double strips 6 and 8. The ends of these strips are separated as shown at 56 and 56' and at 57 and 57'. These separated ends are bent toward each other and welded at 58. They diverge sufficiently to contact the rods 54" and 54''' outside the line joining the centers of those rods. The members 56 and 56', in their unstressed condition, before the insertion of the fuel rods, also diverge downwardly. This is illustrated in the fragmentary views 3A and 3B. FIG. 3A shows these members in plan and FIG. 3B shows them in elevation before the insertion of the fuel rods, the future positions of those rods being shown in phantom lines. When those rods, 54" and 54''', are inserted, the members 56 and 56' are pressed together, as shown in FIGS. 3C and 3D. This produces a spring action, which helps to hold the rods firmly in position. The members 57 and 57' are made similarly. In addition, member 57 is widened, as shown at 60, so as to engage the corner rod 54. For greater strength, widened portion 60 is corrugated, as shown at 59, 59' in FIG. 3H in elevation and in a section taken on the line 3J. Members 57 and 57' are shown in their unstressed condition in FIGS. 3E and 3F, and in their stressed condition, with the fuel rods inserted, in FIGS. 3G, and 3H.

Figure 4:
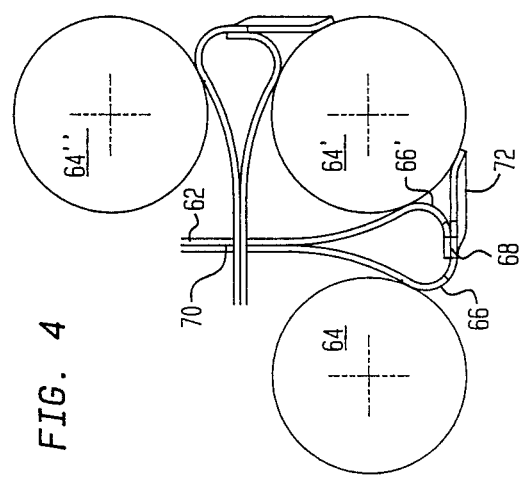

FIG. 4 shows a form of grid composed of single strips rather than the double strips of FIGS. 1 through 3. The strips 62 are bent as shown at 66 so as to contact the fuel rods 64 outside the lines joining their centers. Welded to each strip 62 is a gripping member 66'. The ends of the strips and gripping members are bent toward each other and the two parts are welded together at 68 and 70. Adjacent the corner rods the proper one of these parts is widened at 72 to contact the rod in the same manner as member 60 of FIG. 3.

Figure 5:
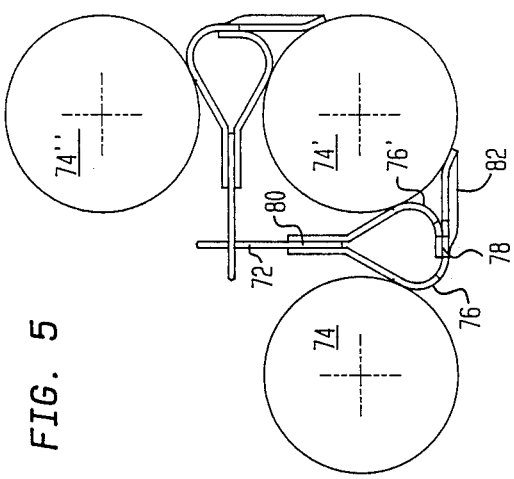
FIGS. 4 and 5 are partial plan views showing still other embodiments of our invention applicable to a different type of deflecting grid.

FIG. 5 shows a modification closely related to that of FIG. 4. In the structure shown in FIG. 5, the grid strip, 80, is straight, and two gripping members 76, 76' are welded to it. Adjacent the corner rods, one of these members is widened at 82.

The gripping members of FIGS. 4 and 5 have the same form as those described in detail in connection with the embodiment of FIG. 3.

The structures shown in FIGS. 1, 1a and 2 may be modified in a manner corresponding to FIG. 4 or FIG. 5 to adapt them to use with single-thickness strips.

While we have described several modifications of our invention in considerable detail, it will be obvious to those skilled in the art that other changes can be made. We therefore, wish our invention to be limited solely by the scope of the appended claims.

We claim as our invention:

1. In a nuclear fuel assembly comprising a plurality of long, parallel fuel rods, a plurality of grid spacers distributed along said fuel rods and binding them together into a bundle, and at least one deflecting grid intermediate two of said grid spacers and adapted to deflect cooling water flowing through said assembly parallel to said fuel rods, the improvement wherein:
    said deflecting grid is formed of a first set of grid strips parallel to each other and extending in a first direction and a second set of grid strips parallel to each other and extending at an angle to an intersecting said first set of grid strips, at least some of said strips having deflecting means for deflecting said cooling water, said deflecting grid having no perimeter strip, each of said grid strips having at its outer most rods of said assembly outwardly of a outer-most rods of said assembly outwardly of a line connecting their centers to restrain movement of said rods; said deflecting grid being formed of double-member strips, the members of each strip being separated near their ends and bent apart so as to contact adjacent outer fuel rods of said assembly.

2. An assembly as defined in claim 1, wherein the outer end of at least one of said members forming a strip is bent back toward the other member and said members are secured together outwardly of their points of contact with said fuel rods.

3. An assembly as defined in claim 2, wherein said members overlap at their ends and are welded together.

4. An assembly as defined in claim 3, wherein one of said fuel rods is a corner rod of said assembly, and further comprising a widened extension on the end of one of the members of each of two strips which extends at right angles past said rod, and contacts said corner rod at a point outwardly of the points of contact of said members with said rod.

5. An assembly as defined in claim 4, wherein said extension is corrugated.

6. In a nuclear fuel assembly comprising a plurality of long, parallel fuel rods, a plurality of grid spacers distributed along said fuel rods and binding them together into a bundle, and at least one deflecting grid intermediate two of said grid spacers and adapted to deflect cooling water flowing through said assembly parallel to said fuel rods, the improvement wherein:
    said deflecting grid is formed of a first set of grid strips parallel to each other and extending in a first direction and a second set of grid strips parallel to each other and extending at an angle to and intersecting said first set of grid strips, at least some of said strips having deflecting means for deflecting said cooling water, said deflecting grid having no perimeter strip, each of said grid strips having at its outer ends gripping members which contact the outer-most rods of said assembly outwardly of a line connecting their centers to restrain movement of said rods; said grid being formed of single-member strips and at least one gripping member being welded to the outer end of each strip, said gripping member being bifurcated and so formed as to contact two adjacent fuel rods outwardly of a line connecting their centers.

* * * * *

UNITED STATES PATENT AND TRADEMARK OFFICE
CERTIFICATE OF CORRECTION

PATENT NO.  : 4,951,299

DATED       : Aug. 21, 1990

INVENTOR(S) : Patterson et al.

It is certified that error appears in the above-identified patent and that said Letters Patent is hereby corrected as shown below:

Column 4

Line 16: delete "outer most rods of said assembly outwardly of a" and insert in its place --outer ends gripping members which contact the--.

Signed and Sealed this

Tenth Day of December, 1991

Attest:

HARRY F. MANBECK, JR.

*Attesting Officer*  *Commissioner of Patents and Trademarks*